Figure 1:
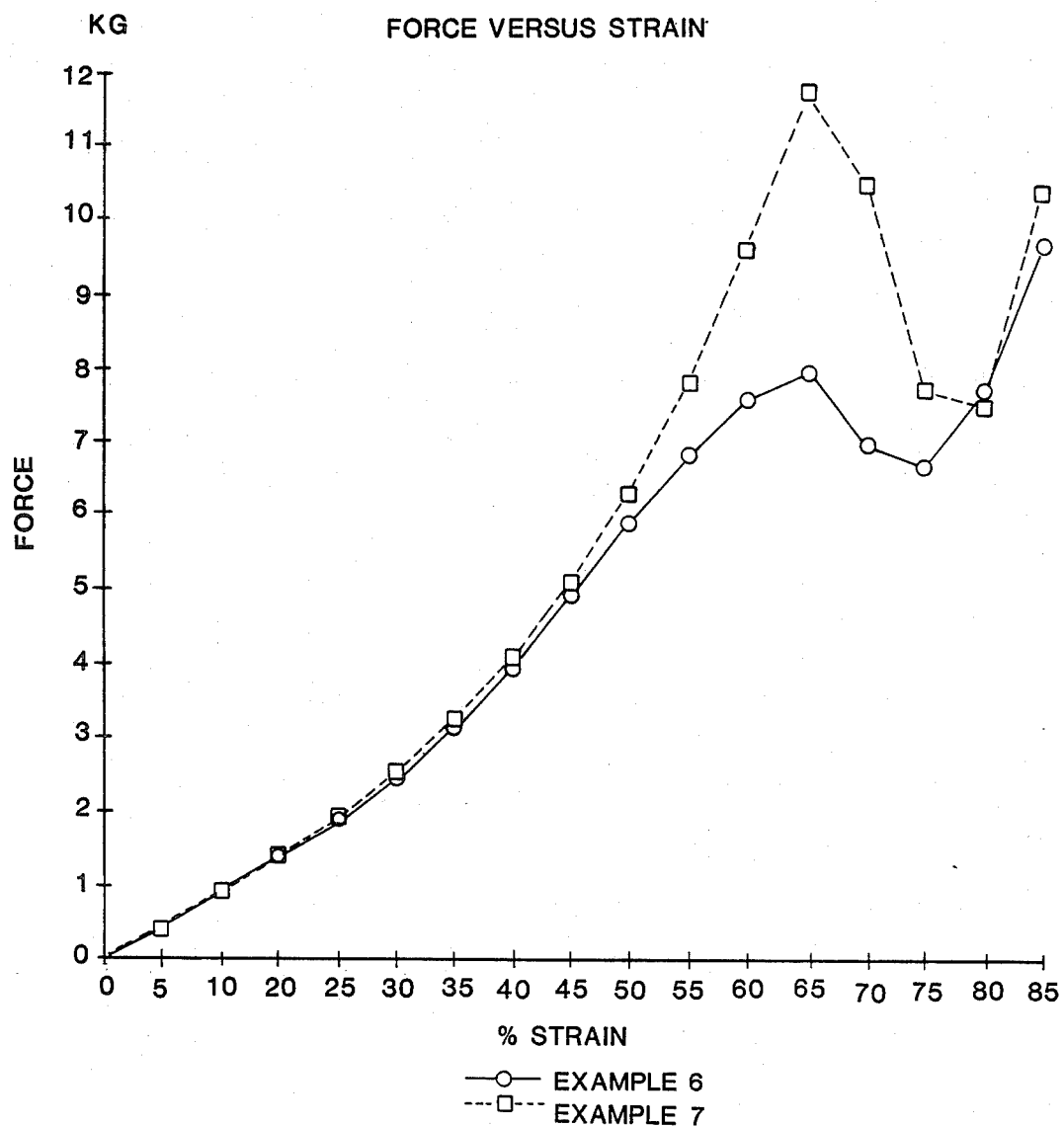

United States Patent [19]

Kratochvil

[11] Patent Number: 4,684,533

[45] Date of Patent: Aug. 4, 1987

[54] IMITATION CHEESE PRODUCTS

[75] Inventor: John F. Kratochvil, Oak Brook, Ill.

[73] Assignee: Kraft, Inc., Glenview, Ill.

[21] Appl. No.: 658,618

[22] Filed: Oct. 9, 1984

[51] Int. Cl.$^4$ .......................... A23D 5/00; A23L 1/04; A23C 20/02

[52] U.S. Cl. ................................. 426/575; 426/576; 426/582; 426/602

[58] Field of Search ............... 426/582, 575, 601, 656, 426/573, 576, 601, 602, 613

[56] References Cited

U.S. PATENT DOCUMENTS

| | | | |
|---|---|---|---|
| 3,397,995 | 8/1968 | Elenbogen | 426/582 |
| 4,089,981 | 5/1978 | Richardson | 426/576 |
| 4,303,691 | 12/1981 | Sand et al. | 426/573 |
| 4,414,236 | 11/1983 | Moran et al. | 426/523 |

OTHER PUBLICATIONS

Food Engineering, "New Approach to Imitation Cheese", Jun. 1977.
Taranto & Yang, "Morpholological and Textural Characterization of Soybean Mozzarella Cheese Analogs", Scanning Electron Microscopy pp. 483-492 (1981).
MacMullan, E. A. et al., "The Precipitation Reaction of Carrageenan with Gelatin", J. Colloid Science, 18 pp. 526-537 (1963).
Yang & Taranto, "Textural Properties of Mozzarella Cheese Analogy Manufactured from Soybeans", J. F. S. vol. 47, pp. 906-910, (1982).

Primary Examiner—Raymond N. Jones
Assistant Examiner—Marianne M. Cintins
Attorney, Agent, or Firm—Fitch, Even, Tabin & Flannery

[57] ABSTRACT

Imitation cheese products are disclosed which consist essentially of from about 0.5 to about 3.0 weight percent kappa carrageenan, from about 1.5 to about 12.0 weight percent gelatin, from about 3 to about 30 weight percent of an edible fat and from about 40 to about 65 weight percent water, in which the gelatin and carrageenan are present as a structurally firm continuous aqueous carrageenan/gelatin phase matrix at refrigeration temperature.

7 Claims, 2 Drawing Figures

IMITATION CHEESE PRODUCTS

The present invention is directed to imitation cheese products such as imitation American process cheese and to methods of producing such imitation cheese products.

Imitation cheeses are conventionally manufactured from separate edible components such as casein, calcium caseinate, or sodium caseinate, which are obtained from milk as edible food grade materials. Such imitation cheeses are substantially less expensive than natural cheese, and may be prepared with restricted salt content for persons requiring salt-limited diets, and may be prepared utilizing vegetable oils instead of the more saturated animal fat present in natural cheese, to provide imitation cheese products having a higher unsaturated fat component and also less cholesterol.

However, casein or caseinates, being derived from the same dairy source as natural cheese, have the disadvantage of being relatively expensive and are subject to the vagaries of excess milk production. Accordingly, there have been substantial efforts to provide imitation cheese products having decreased or minimal casein-caseinate requirements. These efforts have included attempts to develop imitation cheese products which utilize relatively inexpensive soy, cottonseed and peanut protein as a partial or total replacement for the casein-caseinate. Unfortunately, such relatively inexpensive vegetable proteins tend to impart characteristic undesirable flavors to the imitation cheese product, and also result in difficulties in the provision of the desirable cheese texture normally produced through the utilization of casein or caseinates. Work has been carried out to produce soy proteins having more acceptable flavor for imitation cheese products, and efforts have been made to utilize carrageenan to improve the texture of imitation cheese products incorporating vegetable proteins, with combinations of soy and sodium caseinate with carrageenan being utilized in efforts to obtain various desired textures. In this regard, U.S. Pat. No. 4,303,691 to Sand, et al. is directed to a proteinaceous food product intended to simulate cheese, comprising a blend of 25 percent soy isolate, cold insoluble soy fraction, or mixtures thereof, together with specified amounts of gelatin, hydrocolloid gums such as xanthan - locust bean gum mixtures and carrageenans, fat, water, emulsifiers, salt, chelating agent, coloring agent and flavoring. According to Sand, the cheese-like characteristics are believed to be attributable to the combination of the hydrocolloid gum with the soy protein, neither of which materials without the other, provides a product with such characteristics.

U.S. Pat. No. 4,089,981 describes a low calorie imitation cheese loaf featuring cellulose fibers, but also comprising minor amounts of iota carrageenan, locust bean gum, guar gum and gelatin.

There has also been substantial effort directed to development of Mozzarella cheese analogs from soy protein, gelatin, fat and a variety of gums, such as gum arabic, xanthan-locust bean gum and guar gum such as described by Yang, et al., "Morphological and Textural Comparisons of Soybean Mozzarella Cheese Analogs Prepared with Different Hydrocolloids", Food Microstructure, Vol. 1 (1982), pp. 223–231; Taranto, et al., "Morphological and Textural Characterization of Soybean Mozzarella Cheese Analogs", Scanning Electron Microscopy, III, pp. 483–492, 1981.

However, despite the efforts to provide imitation cheese products which have limited casein-caseinate components, such products have various undesirable features. Improved imitation cheese compositions having desirable economics of manufacture together with desirable flavor and performance properties including texture, meltability, shredability and sliceability, would be desirable.

Figure 2:
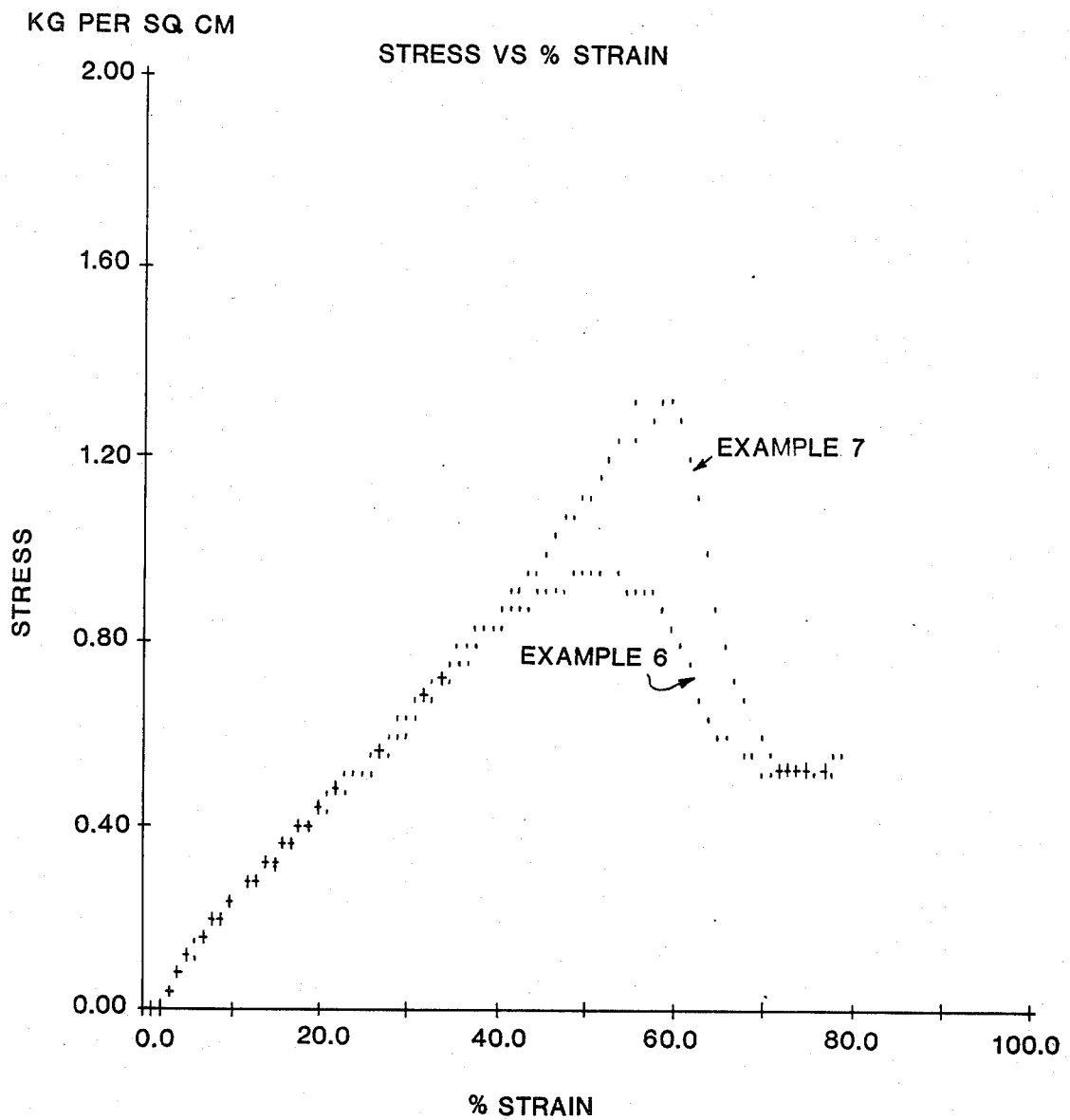

Accordingly, it is an object of the present invention to provide imitation cheese products having excellent economy, flavor and performance characteristics. It is a further object to provide such imitation cheese products and methods for preparing such products, which utilize wholesome food grade ingredients. These and other objects of the present invention will become apparent from the following detailed description and the accompanying drawings of which:

FIG. 1 is a graphic representation of the texture profile analysis force versus percent strain properties of two embodiments of imitation cheese products in accordance with the present invention; and FIG. 2 is a graphic representation of an area normalized texture profile analysis stress versus strain curve of the two imitation process cheese products referred to in the description of FIG. 1.

Generally in accordance with the present invention, imitation cheese products are provided which comprise an aqueous, structurally firm, gelatin-carrageenan continuous-phase matrix, and a dispersed fat phase, together with an emulsification agent. Particularly preferred compositions contain a dairy-derived emulsification agent and may further include a dairy-derived flavoring agent.

As indicated, a principal feature of the present food compositions is a structurally firm, continuous phase gelatin-carrageenan matrix. In this regard, the imitation cheese compositions in accordance with the present invention will generally comprise at least about 1.5 weight percent of medium to high bloom gelatin having a bloom strength of at least about 150, and at least about 0.5 weight percent of kappa carrageenan, based on the total weight of the imitation cheese composition, combined as a structurally firm continuous aqueous phase matrix. The provision of a structurally firm, continuous phase matrix through the use of medium to high bloom strength gelatin and kappa carrageenan is an important feature of imitation cheese products in accordance with the present invention.

A further advantage of the gelatin-carrageenan matrix is that it melts when sufficient heat is applied, which does not occur with many other hydrocolloid, protein or hydrocolloid-protein matrixes. In this regard, the melting characteristics of the imitation cheese products of the present invention may be quantified by melting tests in which a disc of the imitation cheese product having predetermined thickness and diameter is subjected to elevated temperature conditions for a predetermined period of time to measure the increased disc diameter (and consequent decrease in disc thickness) resulting from flow of the melted imitation cheese product in response to gravity. Such testing may be carried out by placing a flat circular disc of the imitation cheese product having a diameter of ⅝ inch and a thickness of ¼ inch on a horizontal metal surface maintained at a temperature of 100° C. for four minutes. In accordance with the present invention, imitation cheese compositions may be readily provided which are firm at refrigeration temperature (i.e., 45° F.) and which exhibit desirable melt characteristics at elevated temperatures, as characterized by having a test melt diameter of at least about 1.10 inches and preferably at least about 1.25 inches, after four minutes at the test temperature of 100° C.

Gelatins that may be used include medium to high bloom gelatins which are prepared by either acid or alkaline hydrolysis. Gelatin is conventionally provided by selective hydrolysis of collagen, a major intercellular protein constituent of connective tissue. Gelatin consists of a mixture of suitable proteins of high average molecular weight that are capable of forming a firm gel in an aqueous medium. Medium to high bloom strength gelatin will generally have a relatively high weight average molecular weight, such as at least about 125,000.

As indicated in accordance with the present invention, an imitation cheese product is provided comprising a gelatin-carrageenan continuous phase matrix which is structurally firm at refrigeration temperatures, and in this regard the gelatin should be present at a level of at least about 1.5 weight percent based on the total weight of the composition. In some imitation cheese products, the preferred gelatin level may be as high as 12 weight percent, depending on the type of product involved.

Also important in the imitation cheese products of the present invention is the provision of a kappa carrageenan component which, with the medium to high bloom strength gelatin, participates in the formation of the structurally firm continuous phase of cheese compositions. There are three general varieties of carrageenans including the kappa variety, the lambda variety and the iota variety. The kappa carrageenan is utilized in the composition of the present invention. By kappa carrageenan is meant a hydrocolloid mainly consisting of a copolymer of alternating D-galactose (4) sulfate ester and 3,6 anhydro-D-galactose units, existing as a salt with potassium, sodium, magnesium and calcium ions. A small percentage of the 3,6 anhydro-D-galactose units are sulfated in the 2 position.

The carrageenan should be present in an amount of at least about 0.5 weight percent. In some imitation cheese products the preferred carrageenan range is from about 1.5% to about 3.0% of the total weight of the imitation cheese composition. In addition, the weight ratio of the carrageenan to the gelatin component should be in the range of from about 1:6 to about 1:1, on a dry basis.

As indicated, the imitation cheese compositions further comprise a dispersed fat phase, and in this regard will generally comprise at least about 10%, and usually in the range of from about 15 to about 30 weight percent, based on the total weight of the imitation cheese composition, of an edible fat component. However, low fat products can also be made with less than 10% fat content. Fat derived from milk and vegetable fats such as soybean, coconut, palm kernel, sunflower, canola (rapeseed), peanut, corn, safflower, and cottonseed oils may desirably be used as the fat component. Particularly preferred are partially hydrogenated vegetable oils such as soybean, cottonseed, corn and coconut oils having an I.V. in the range of from about 65 to about 90 and milk fat. The vegetable fats may desirably have a melting point in the range of from about 32° to about 45° C. The melting point of the fat is not critical and can be varied depending upon the properties of the product desired. It has been found that fats suitable for use in formulations, according to the present invention include, for example, milk fat and products produced commercially having melting points in the range of from about 34° to about 40° C. such as margarine fat and coating fats.

The fat component is uniformly dispersed throughout the gelatin-carrageenan continuous phase matrix. Generally such dispersion is carried out and maintained at least in part through the utilization of a suitable emulsification agent and appropriate processing steps, as will be more fully explained hereinafter.

As indicated, the imitation cheese compositions will further comprise a suitable emulsifying agent, and in this regard, buttermilk powder, which includes a substantial phospholipid content (e.g., about 0.2 weight percent), is particularly preferred as an emulsifying agent. Other conventional emulsification agents such as mono and diglycerides, phospholipids, polysorbates, sorbitan esters and polyoxyl esters may be utilized, and even emulsification agents such as non-fat dry milk, whey (protein), casein or caseinates may be used.

Generally, the emulsification agents will be present at an effective amount in the composition to achieve dispersion of the fat phase, which may be in the range of from about 0.2 to about 12 weight percent, based on the total weight of the composition, and dependent upon the types of emulsification agents used and the type of product being produced.

As indicated, the imitation cheese composition comprises a firm, aqueous carrageenan-gelatin continuous phase matrix, and in this regard, an appropriate amount of water is also an important component of the imitation cheese compositions of the present invention. Water may generally be present in the compositions at a level of at least about 40 weight percent, and preferably in the range of from about 50 to about 65 weight percent, based on the total weight of the imitation cheese composition. The water is predominantly present in the carrageenan-gelatin continuous phase of the cheese composition.

A food grade acid component may be used in the imitation cheese compositions of the present invention to provide the composition with a pH value in the range of from about 4.7 to about 6.0 and preferably from about 5.1 to about 5.7. Although maximum firmness of the kappa carrageenan-gelatin continuous phase aqueous matrix is provided at a pH of about 4.7, the level of acidity should best be provided at about pH 5.1 to 5.7 for flavor considerations. Suitable food grade acids include adipic acid, citric acid, lactic acid, acetic acid, phosphoric acid and the like. It will be appreciated that acidic components may be incorporated into or may be inherent in ingredient components, or may be added as a separate component during manufacture of the matrix to provide adjustment of the pH to the desired value.

Particularly preferred imitation cheese products of the present invention further include up to about 50 weight percent of a fermented dairy derived flavoring agent, based on the total weight of the imitation cheese product, such as a flavored cheese product or cheese product having an intensified American cheese flavor, as described in U.S. Pat. No. 4,172,900. When using such a highly intensified cheese product component, the component will desirably be present in an amount of from about 1% to about 8% based on the total weight of the product. Cheese products in which a proteolytic micrococcus, a self-limiting lipase and a flavor culture are utilized in the make procedure are also particularly desirable flavoring components of the imitation cheese products. The casein and other protein components of such flavoring agents are substantially hydrolyzed.

Generally in accordance with the present invention, methods are also provided for manufacture of imitation cheese products comprising the steps of providing from about 1.5 to about 12 parts by weight of a gelatin having a water content of less than about 11% and a bloom strength of at least about 150 in finely divided form having a particle size of less than about 40 mesh, providing at least about 0.5 parts by weight of kappa carrageenan having a water content of less than about 12% in finely divided form having a particle size of less than about 60 mesh such that the carrageenan and gelatin have a carrageenan/gelatin weight ratio in the range of from about 1:6 to about 1:1, dry basis, providing from about 10 to about 30 parts by weight of an edible fat, blending the gelatin and carrageenan with the fat at a temperature of at least about 15° C., to provide a homogeneous mixture having a continuous fat phase in which the carrageenan and gelatin are dispersed in the continuous fat phase. Emulsifiers and other non-aqueous optional ingredients such as flavorings, antimycotics, stabilizers and coloring may desirably be blended with the carrageenan and gelatin in the continuous fat phase. The continuous fat phase mixture may subsequently be blended with dairy derived flavoring agents, if desired, with enough water to provide from about 40 to about 65 parts of water in the final product, and sodium chloride, if desired, to form a premix. Alternatively, it may be desirable to delete a portion or all of the water and add the water directly at the cooker. The premix is mixed and heated to at least about 70° C. with an optional emulsifying salt and then cooled to a temperature of less than about 10° C. to provide a structurally firm continuous phase aqueous carrageenan-gelatin matrix having a dispersed fat phase homogeneously distributed therein. The optional emulsifying salt may be incorporated in the premix, preferably as the last ingredient used. If a food grade acid is used it may be dissolved in the premix water or it may be added to the other ingredients prior to, during or after the heating process. In special instances in which vegetable fat is not used, such as a cream cheese product containing non-cheese components (see formula 8, hereinafter), the carrageenan and gelatin may be gradually blended into a moist dairy derived flavoring agent at about 5° to 25° C. in such a manner so as to prevent lumping of the carrageenan and gelatin due to too rapid hydration.

Having generally described various aspects of the present invention, the invention will now be more particularly described with respect to specific imitation cheese products.

Particularly preferred formulations prepared in this manner illustrating various aspects of the present disclosure are as follows:

IMITATION AMERICAN PROCESS CHEESE FORMULATIONS

| Ingredients | Formula 1 Weight % | Formula 2 Weight % | Formula 3 Weight % | Formula 4 Weight % |
|---|---|---|---|---|
| Margarine fat, a hydrogenated vegetable oil having a melting point of about 35° +/− 1° C. | 9.25 | 11.90 | 17.50 | 20.75 |
| Gelatin (40 Mesh) | 6.00 | 3.00 | 4.80 | 5.25 |
| Kappa Carrageenan (60 Mesh) | 2.50 | 1.70 | 1.60 | 1.90 |
| Rennet Casein (120 Mesh) | 5.00 | — | — | — |
| Buttermilk Powder | — | 6.00 | 2.00 | 5.25 |
| Sweet Whey Powder | — | — | 1.25 | — |
| Starch | — | — | — | 1.50 |
| Mono and Di-Glycerides | 0.75 | 0.75 | 0.75 | 0.83 |
| Sorbic Acid | 0.30 | 0.30 | 0.10 | 0.20 |
| Apo Carotenal (2%) Color | 0.05 | 0.05 | 0.08 | 0.08 |
| American Cheese (Medium to Aged) | 30.00 | 30.00 | 20.00 | — |
| American Cheese (Intensified Flavor) | — | — | — | 5.00 |
| Water | 38.15 | 44.30 | 40.17 | 46.57 |
| Lactic Acid (88%) | 0.25 | 0.25 | 0.25 | — |
| Sodium Chloride | 1.00 | 1.00 | 1.25 | 1.50 |
| Steam Condensate | 6.00 | — | 8.00 | 7.00 |
| Sodium Citrate | 0.75 | 0.75 | 2.25 | — |
| Flavorings | — | — | — | 2.97 |
| Citric Acid | — | — | — | 0.20 |
| Disodium Phosphate | — | — | — | 1.00 |
| | 100.00 | 100.00 | 100.00 | 100.00 |

IMITATION AMERICAN PROCESS CHEESE FORMULATIONS

| Ingredients | Formula 5 Weight % | Formula 6 Weight % | Formula 7 Weight % |
|---|---|---|---|
| Margarine fat, a hydrogenated vegetable oil having a melting point of about 35° +/− 1° C. | 23.50 | 13.00 | 23.00 |
| Gelatin (40 Mesh) | 4.00 | 3.50 | 5.75 |
| Kappa Carrageenan (60 Mesh) | 1.80 | 1.90 | 1.90 |
| Rennet Casein (120 Mesh) | 3.50 | 2.50 | 4.50 |
| Calcium Caseinate | — | 1.00 | 1.00 |
| Buttermilk Powder | 4.60 | — | — |
| Mono and Di-Glycerides | 0.75 | 0.75 | 0.80 |
| Sorbic Acid | 0.30 | 0.25 | 0.25 |
| Apo Carotenal (2%) Color | 0.05 | 0.05 | 0.05 |
| American Cheese (Medium to Aged) | — | 30.00 | — |
| American Cheese (Intensified Flavor) | 5.00 | — | 5.00 |
| Water | 54.00 | 36.80 | 48.00 |
| Lactic Acid (88%) | 0.25 | 0.25 | 0.25 |
| Sodium Chloride | 1.50 | 1.00 | 1.50 |
| Steam Condensate | — | 8.00 | 6.00 |
| Sodium Citrate | 0.75 | 1.00 | 0.75 |
| Flavorings | — | — | 1.25 |
| | 100.00 | 100.00 | 100.00 |

FLAVORED IMITATION CREAM CHEESE FORMULATION

| Ingredients | Formula 8 Weight % |
|---|---|
| Cream Cheese | 70.00 |
| Gelatin (40 Mesh) | 1.50 |
| Kappa Carrageenan (60 Mesh) | 0.50 |
| Strawberry Flavor | 20.00 |
| Steam Condensate | 8.00 |
| | 100.00 |

EXAMPLE I

A sliced imitation American process cheese product was prepared from Formula 1 by first making a premix of all ingredients (except the sodium citrate) according to the method previously described. The premix was then mixed with the sodium citrate and heated to 79.5° C. by steam injection in a cooker. The hot product was pumped to standard process cheese slice forming equipment, whereupon slices were formed and cooled. The finished product had clean medium cheese flavor, a pH of 5.33 and a moisture of about 56.6%. After refrigerated storage the slices separated well and had acceptable melt characteristics.

EXAMPLE II

A sliced imitation American process cheese product was prepared from Formula 2 according to a similar procedure as used in Example I except that the sodium citrate was blended into the premix as the last ingredient and the premix was heated to 85° C. in an indirect steam, swept surface, heat exchanger. After cooling, the slices had extremely good flavor, texture and melt characteristics, 56.0% moisture and a pH of 5.10.

EXAMPLE III

Imitation American process cheese slices were prepared from Formula 3 according to the procedure used in Example I except that the batch was heated to 83.5° C. After cooling and storage, the slices had very clean buttery mild-medium cheese flavor, a pH of 5.61 and a moisture of about 55.9%. The product had nice smooth cheeselike texture and excellent melt characteristics.

EXAMPLE IV

A sliced imitation American process cheese Product was prepared from Formula 4 by a procedure similar to that used in Example I. However, in this case, the citric acid was dissolved in 1% (batch weight) of water which was deleted from the premix) and this acidified water was mixed with the premix and the disodium phosphate in the cooker. The flavorings were incorporated in the premix. The batch was cooked to 79.5° C. The finished product had a clean mild cheese flavor and good melt characteristics.

EXAMPLE V

Imitation American process cheese slices were prepared from Formula 5 according to the procedure used in Example II. After cooling, the slices had a mild clean cheese flavor, nice cheese-like texture, very good melt, 57.2% moisture, and a pH of 5.52.

EXAMPLE VI

An imitation American process cheese product in loaf form was prepared as in Example I but from Formula 6. The hot product was filled into 20 lb. and 5 lb. loaves. The loaves were placed in a 7° C. cooler. After cooling and storage, the products had 56.1% moisture, a pH of 5.31 and possessed a clean mild-medium cheese flavor and good slice, shred and melt characteristics. The shredded samples did not mat during refrigerated storage.

EXAMPLE VII

Loaves of imitation American process cheese were prepared as in Example VI but from Formula 7. After cooling, the products had a pH of 5.38 and 57.3% moisture. They had a mild clean cheese flavor and good slice, shred and melt characteristics. Shreds did not mat together during refrigerated storage.

EXAMPLE VIII

Slices of fruit flavored imitation cream cheese were prepared from Formula 8 by gradually blending the gelatin and carrageenan into cream cheese (at about 10° C.) until homogeneous, mixing in the strawberry flavoring, steam heating the mixture to 85° C. and forming and cooling slices of the product in an individually wrapped slice packaging - cooling machine. The finished product had a delicious strawberry cream cheese flavor and a nice smooth texture.

Physical parameters of the imitation cheese products of Examples 6 and 7 are measured under compression by means of an Instron testing apparatus generally in accordance with the procedure described by Bourne in "Texture Profile Analysis", Food Technology, July, 1978, p. 62, et. seq. In the testing, which is carried out at a refrigeration temperature of about 45° F., cylindrical samples of the hard cheese which are 21 mm in diameter and 25 mm in height are twice compressed at a constant velocity of 100 mm/minute by an Instron Universal Testing Machine, Model 1122 (manufactured by the Instron Corporation, Canton, Massachusetts) to a thickness of 5 mm. Measurement of the force in kilograms versus the deformation distance are charted for the products of Examples 6 and 7, respectively, as shown in FIG. 1, which is a graphic representation of the force versus compression distance data. When a sample has been compressed to 1/5 of its original height, the deformation is stopped, the force removed and then reapplied. The force is mathematically normalized to the expanding (with compression) area of the cheese cylinder by assuming a cylindrical shape for the compressed cheese cylinder (which during the actual run may have a truncated cone shape, rather than a cylindrical shape) to determine a normalized force per unit area or stress value. The results of a normalized texture profile analysis stress versus strain curves, of the two products appear graphically as FIG. 2. As shown in FIGS. 1 and 2, the imitation cheese products have a firm but elastic texture at a refrigeration temperature of 45° F. The measured and calculated texture profile values of Fracturability, Hardness, Springiness, Cohesiveness, Gumminess and Chewiness are set forth in the following table. The mean and standard deviation figures corresponding to 4 tests were also calculated for the data and are set forth in the table.

TABLE I

| TPA CHARACTERISTICS OF SAMPLES | | |
|---|---|---|
| | Example VII | Example VI |
| FAPOF Kg/cm$^2$ | 1.37 ± 0.02 | 0.92 ± 0.06 |
| POF % Def. | 60.5 ± 0.3 | 52.8 ± 1.1 |
| Fracturability Kg | 12.4 ± 0.3 | 7.2 ± 0.1 |
| Hardness Kg | 12.4 ± 0.3 | 9.0 ± 0.8 |
| Springiness mm | 4.6 ± 0.2 | 3.8 ± 0.1 |
| Cohesiveness | 0.07 ± .003 | 0.066 ± .001 |
| Gumminess Kg | 0.8 ± 0.1 | 0.6 ± 0.1 |
| Chewiness | 450 ± 10 | 350 ± 23 |

As set forth in the previously referred to paper, the Fracturability of a sample is defined as the force at the first significant break in the force-compression distance curve. The Hardness of a sample is defined as the peak force during the first compression cycle, and the Cohesiveness is defined as the ratio of the positive force area under the curve during the second compression to that during the first compression. The Springiness is defined as the height that the cheese recovers during the time that elapses between the end of the first compression cycle and the start of the second cycle. The Gumminess is defined as the product of Hardness and Cohesiveness, while the Chewiness is defined as the sum of the positive force areas under the curve during the first and second compressions. The Point of Fracture (POF) is defined as the compression at which the first significant break occurs in the normalized texture profile analysis, stress versus strain curve. The Force at the Point of Fracture (FAPOF) is defined as the stress corresponding to the POF.

It is noted that the cheese ingredient introduces a casein component into the formulation, and that about 25% of the buttermilk powder is casein. The buttermilk powder, however, is introduced primarily as an emulsifier in view of its phospholipid content. The buttermilk powder might be eliminated if a Tween-type emulsifier could be used, but it also contributes desirable flavor and nutrition values. Also the casein molecules in medium aged or aged cheese are significantly hydrolyzed by bacterial proteases.

Although the invention has been described in considerable detail with reference to certain preferred embodiments thereof, it will be understood that variations and modifications can be affected within the spirit and scope of the invention as described above and as defined in the appended claims.

What is claimed is:

1. An imitation cheese product consisting essentially of from about 0.5 to about 3.0 weight percent Kappa carrageenan having an average molecular weight of at least about 100,000, from about 1.5 to about 12.0 weight percent gelatin having a bloom strength of at least about 150, the weight ratio of said Kappa carrageenan to said gelatin being in the range of from about 1:6 to 1:1, from about 3 to about 30 weight percent of an edible fat, and from about 40 to about 65 weight percent of water, based on the total weight of said imitation cheese composition, said carrageenan and said gelatin being present in a structurally firm continuous carrageenan-gelatin phase at refrigeration temperature having a pH in the range of from about 4.7 to about 6.0 and said fat being homogeneously dispersed in said continuous carrageenan-gelatin phase.

2. An imitation cheese product in accordance with claim 1 wherein said continuous carrageenan-gelatin phase has a pH in the range of from about 5.1 to about 5.7.

3. An imitation cheese product in accordance with claim 1 wherein said imitation cheese product is firm at a refrigeration temperature of 45° F. and has a disc test melt diameter of at least about 1.25 inch at a temperature of 100° C. for 4 minutes from an initial $\frac{7}{8}$ inch diameter $\frac{1}{4}$ inch thick disc.

4. An imitation cheese product in accordance with claim 1 wherein said gelatin has a bloom strength of at least about 200 and wherein said imitation cheese product comprises edible fat in an amount in the range of from about 10 to about 30 weight percent based on the total weight of the product.

5. A method of manufacturing an imitation cheese product consisting essentially of providing a gelatin having a water content of less than about 11% and a bloom strength of at least about 150 in finely divided form having a particle size of less than about 40 mesh, providing a kappa carrageenen having a water content of less than about 12 weight percent in finely divided form having a particle size of less than about 60 mesh, blending the gelatin and carrageenan at a temperature of at least about 10° C. with an edible fat to provide a homogeneous mixture having a continuous fat phase in which the carrageenan and gelatin are dispersed in the continuous fat phase, blending the continuous fat phase mixture with water to form a premix, and subsequently mixing and heating the premix to at least about 70° C. to provide a heated, blended imitation cheese composition, and cooling the heated, blended imitation cheese composition to less than about 10° C. to provide an imitation cheese product comprising from about 0.5 to about 3.0 weight percent Kappa carrageenan having an average molecular weight of at least about 100,000, from about 1.5 to 12.0 weight percent gelatin having a bloom strength of at least about 150, said Kappa carrageenan and gelatin being present at a weight ratio of Kappa carrageenan to gelatin in the range of from about 1:6 to about 1:1, from about 3 to about 30 weight percent edible fat, and from about 40 to about 65 weight percent water, and having a structurally firm continuous phase aqueous carrageenan-gelatin matrix having a dispersed fat phase homogeneously distributed therein.

6. A method in accordance with claim 5 wherein a dairy based flavoring agent is blended with said premix.

7. A method in accordance with claim 5 wherein said edible fat is provided as a constituent of cream cheese and wherein said gelatin and said carrageenan are blended with said cream cheese at a temperature of less than about 40° C.

* * * * *